(12) United States Patent
Park et al.

(10) Patent No.: US 12,025,571 B2
(45) Date of Patent: Jul. 2, 2024

(54) OPTICAL INSPECTION DEVICE FOR OPTICAL PERFORMANCE TEST OF DISPLAY DEVICE AND OPTICAL INSPECTION METHOD USING THE SAME

(71) Applicant: SAMSUNG DISPLAY CO., LTD., Yongin-si (KR)

(72) Inventors: Gil Yeong Park, Yongin-si (KR); Min Kyoung Jung, Yongin-si (KR); Hee Young Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 266 days.

(21) Appl. No.: 17/222,840

(22) Filed: Apr. 5, 2021

(65) Prior Publication Data

US 2022/0057337 A1     Feb. 24, 2022

(30) Foreign Application Priority Data

Aug. 20, 2020  (KR) .......................... 10-2020-0104882

(51) Int. Cl.
*G01N 21/956*     (2006.01)
*G01M 11/02*      (2006.01)
(Continued)

(52) U.S. Cl.
CPC ............ *G01N 21/956* (2013.01); *G01M 11/02* (2013.01); *G01N 21/21* (2013.01); *G02F 1/1309* (2013.01);
(Continued)

(58) Field of Classification Search
CPC ............. G01J 1/4257; G01J 2001/4247; G01J 2001/4252; G01M 11/02; G01M 11/0207; G01M 11/0278; G01M 11/0285; G01N 2021/218; G01N 2021/8848; G01N 2021/9511; G01N 2021/9513; G01N 21/21; G01N 21/211; G01N 21/23; G01N 21/59; G01N 21/8851; G01N 21/956; G09G 3/006; G09G 2300/04; G01P 13/00; G01P 13/02; G01D 21/00; G01D 21/02; G02F 2201/58; G02F 1/13; G02F 1/1306; G02F 1/1309;
(Continued)

(56) References Cited

U.S. PATENT DOCUMENTS 3,687,555 A * 8/1972 Yamamoto ................ G01J 4/04
                                                    250/225
3,741,661 A * 6/1973 Yamamoto ........... G01N 21/211
                                                    250/225
(Continued)

FOREIGN PATENT DOCUMENTS

CN     104813223 A * 7/2015 ......... G02B 27/2214
CN     111781698 A * 10/2020
(Continued)

*Primary Examiner* — Gordon J Stock, Jr.
(74) *Attorney, Agent, or Firm* — CANTOR COLBURN LLP

(57) ABSTRACT

An optical inspection device for an optical performance test of a display device including a lens part configured to transmit external light, a phase film part configured to change a phase difference of the external light and transmit the external light, and an image processor configured to obtain electrical information of the external light, in which a phase difference of the phase film part is at least 7000 nm.

9 Claims, 11 Drawing Sheets

(51) Int. Cl.
*G01N 21/21* (2006.01)
*G01N 21/88* (2006.01)
*G01N 21/95* (2006.01)
*G02F 1/13* (2006.01)

(52) U.S. Cl.
CPC ............... *G01N 2021/218* (2013.01); *G01N 2021/8848* (2013.01); *G01N 2021/9511* (2013.01); *G01N 2021/9513* (2013.01)

(58) Field of Classification Search
CPC ... G02F 1/15; G02F 1/17; G02F 1/172; G06T 2207/30121; G06T 2207/30204
See application file for complete search history.

(56) References Cited

U.S. PATENT DOCUMENTS

| | | | | |
|---|---|---|---|---|
| 3,992,104 A * | 11/1976 | Watanabe | ........... | G01N 21/211 356/369 |
| 5,764,363 A * | 6/1998 | Ooki | ........... | G01B 11/0608 356/369 |
| 6,650,410 B2 * | 11/2003 | Shimoda | ........... | G01N 21/23 356/239.1 |
| 6,657,218 B2 * | 12/2003 | Noda | ........... | G02F 1/1309 250/559.39 |
| 6,906,763 B2 * | 6/2005 | Ozeki | ........... | G01B 11/0675 349/158 |
| 7,271,892 B2 * | 9/2007 | Shibata | ........... | G01N 21/956 356/369 |
| 7,372,567 B2 * | 5/2008 | Shribak | ........... | G01N 21/19 356/364 |
| 7,701,561 B2 * | 4/2010 | Zou | ........... | G01N 21/21 356/73 |
| 7,850,801 B2 * | 12/2010 | Kobayashi | ........... | G01N 21/8422 156/379 |
| 7,995,205 B2 * | 8/2011 | Miller | ........... | G01J 4/04 356/364 |
| 8,107,078 B2 * | 1/2012 | Oh | ........... | G01N 21/958 356/370 |
| 8,514,380 B2 * | 8/2013 | Zou | ........... | G01N 21/21 356/73 |
| 8,830,461 B2 * | 9/2014 | Choi | ........... | G02F 1/133553 356/364 |
| 9,310,318 B2 * | 4/2016 | Urano | ........... | G01N 21/95607 |
| 9,581,842 B2 * | 2/2017 | Choi | ........... | G01N 21/8806 |
| 9,625,369 B2 * | 4/2017 | Shribak | ........... | G02B 27/286 |
| 9,683,930 B2 * | 6/2017 | Freudenthal | ........... | G01N 21/23 |
| 10,168,273 B1 * | 1/2019 | Huang | ........... | G01N 21/956 |
| 10,228,287 B2 * | 3/2019 | Shen | ........... | G02F 1/0136 |
| 10,823,892 B2 * | 11/2020 | Jo | ........... | G01M 11/02 |
| 2008/0116928 A1 * | 5/2008 | Kim | ........... | G03B 27/735 324/754.21 |
| 2016/0154229 A1 * | 6/2016 | Milner | ........... | G01N 21/23 348/79 |
| 2020/0150054 A1 * | 5/2020 | Leong | ........... | G01N 21/9501 |
| 2022/0077429 A1 * | 3/2022 | Lee | ........... | H10K 50/86 |
| 2022/0342135 A1 * | 10/2022 | Tanaka | ........... | B32B 7/023 |

FOREIGN PATENT DOCUMENTS

| | | | | |
|---|---|---|---|---|
| JP | 2009047476 A | * | 3/2009 | ........... G01M 11/00 |
| JP | 2009097915 A | * | 5/2009 | |
| JP | 2009198354 A | * | 9/2009 | |
| KR | 20080086928 A | * | 9/2008 | |
| KR | 20180065668 A | * | 6/2018 | |
| KR | 10-2022-0033616 | | 3/2022 | |
| WO | WO-2021065967 A1 | * | 4/2021 | ........... G02B 5/3083 |

* cited by examiner

OPTICAL INSPECTION DEVICE FOR OPTICAL PERFORMANCE TEST OF DISPLAY DEVICE AND OPTICAL INSPECTION METHOD USING THE SAME

CROSS-REFERENCE TO RELATED APPLICATION

This application claims priority from the benefit of Korean patent application 10-2020-0104882 filed on Aug. 20, 2020, which is hereby incorporated by reference for all purposes as if fully set forth herein.

BACKGROUND

Field

Embodiments of the invention relate generally to an optical inspection device and, more specifically, to an optical inspection device for optical performance test of a display device and an optical inspection method using the same.

Discussion of the Background

Recently, a method of providing a multi-layer film in a display device has been employed to improve mechanical characteristics of the display device. However, the multi-layer film frequently causes a phenomenon in which optical data output from the display device is distorted. As such, in an optical performance test of the display device, the reliability of the optical performance test may be deteriorated.

The above information disclosed in this Background section is only for understanding of the background of the inventive concepts, and, therefore, it may contain information that does not constitute prior art.

SUMMARY

An optical inspection device for optical performance test of a display device and an optical inspection method using the same are capable of improving optical inspection reliability.

Additional features of the inventive concepts will be set forth in the description which follows, and in part will be apparent from the description, or may be learned by practice of the inventive concepts.

An optical inspection device for an optical performance test of a display device according to an embodiment includes a lens part configured to transmit external light, a phase film part configured to change a phase difference of the external light and transmit the external light, and an image processor configured to obtain electrical information of the external light, in which a phase difference of the phase film part is at least 7000 nm.

The optical inspection device may further include a polarizing part having a first absorption axis and a first transmission axis vertical to the first absorption axis, the polarizing part being configured to not transmit light parallel to the first absorption axis and transmit light parallel to the first transmission axis, and a light receiving part configured to receive light provided thereto, and including a polarizer having a first polarizing axis.

The optical inspection device may further include a phase retardation part disposed between the lens part and the image processor, the phase retardation part being configured to retard a phase of light provided thereto.

The phase retardation part may include a $\lambda/4$ phase retardation layer.

The phase film part may have a phase difference of at least 8000 nm.

An angle defined between the first polarizing axis and the first absorption axis or the first transmission axis may be in a range of 25 degrees to 65 degrees.

The phase film part may have a first optical axis, and an angle defined between the first optical axis and one of the first absorption axis and the first transmission axis may be in a range of 25 degrees to 65 degrees.

The phase film part may have a first optical axis, and an angle defined between the first optical axis and the first polarizing axis may be in a range of 25 degrees to 65 degrees.

The phase retardation part may have a second optical axis, and an angle defined between the second optical axis and one of the first absorption axis and the first transmission axis may be in a range of 25 degrees to 65 degrees.

The phase retardation part may have a second optical axis, and an angle defined between the second optical axis and the first polarizing axis may be in a range of 25 degrees to 65 degrees.

An optical inspection method according to another embodiment includes preparing a display device and an optical inspection device, locating the optical inspection device on a front surface of the display device, and acquiring, by the optical inspection device, information on light emitted from the display device, in which the display device has a display area and includes a light emitting element configured to emit light in the display area, the optical inspection device has an optical path through which light provided from the outside is transmitted to acquire information of the light, the optical inspection device including a phase film part configured to change a phase difference of light provided thereto, and the phase film part has a phase difference of at least 7000 nm.

The display device may include a polarizing film including a first absorption axis and a first transmission axis orthogonal to the first absorption axis, and light provided from the display device may have a first polarizing axis, and a first angle defined between the first polarizing axis and one of the first absorption axis and the first transmission axis may be in a range of 45 degrees to 65 degrees.

The optical inspection device may further include a light receiving part configured to receive light provided thereto, and including a polarizer having a second polarizing axis, and a polarizing part disposed on the optical path, and including a second absorption axis and a second transmission axis orthogonal to the second absorption axis.

A second angle defined between the second transmission axis and one of the second absorption axis and the second transmission axis may be in a range of 25 degrees to 65 degrees.

Locating the optical inspection device on the front surface of the display device may include arranging the optical inspection device to have the first absorption axis in parallel to the second absorption axis.

The optical inspection device may further include a phase retardation part disposed on the optical path to retard a phase of light provided thereto.

The phase retardation part may include a 14 phase retardation layer.

The phase film part may have a phase difference of at least 8000 nm.

The phase film part may have a first optical axis, and an angle defined between first optical axis and one of the first absorption axis and the first transmission axis may be in a range of 25 degrees to 65 degrees.

The phase retardation part may have a second optical axis, and an angle defined between the second optical axis and one of the second absorption axis and the second transmission axis may be in a range of 25 degrees to 65 degrees.

The phase retardation part may have a second optical axis, and an angle defined between the second optical axis and one of the first absorption axis and the first transmission axis may be in a range of 25 degrees to 65 degrees.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
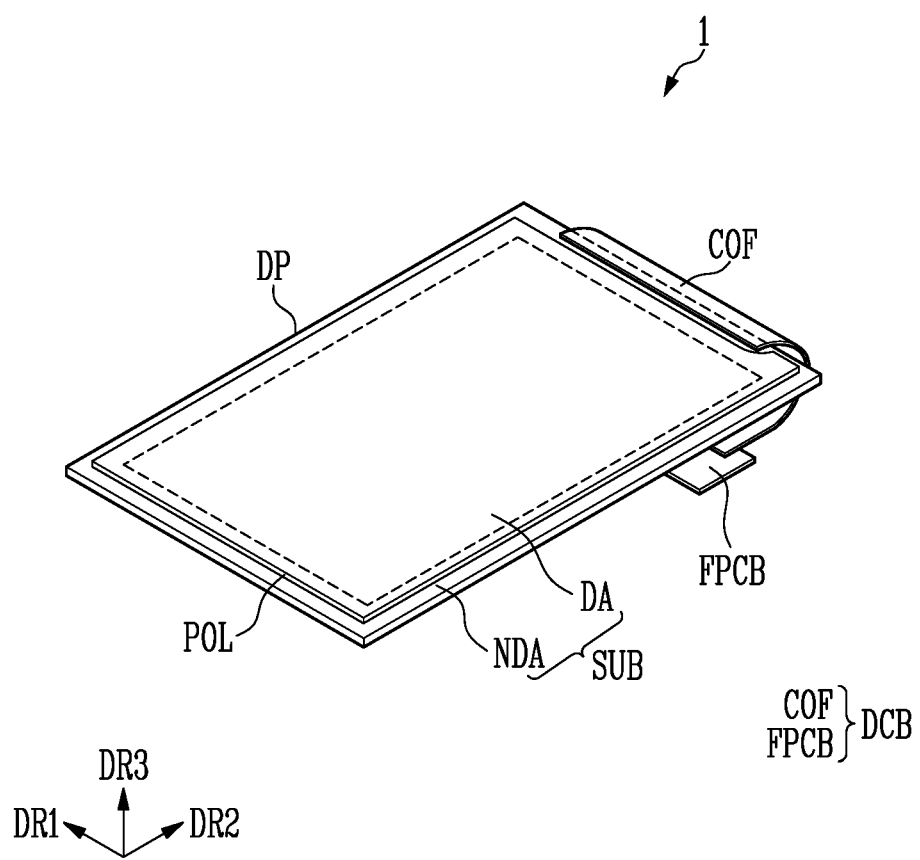
FIG. 1 is a perspective view of a display device as an optical inspection target in accordance with an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath"

other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The inventive concepts generally relate to an optical inspection device for optical performance test of a display device and an optical inspection method using the same.

Prior to describing an optical inspection device (see '20' shown in FIG. 9) in more detail according to an embodiment, a display device 1 subjected to an inspection as a target by the optical inspection device 20 will be described with reference to FIGS. 1 and 7.

Figure 2:
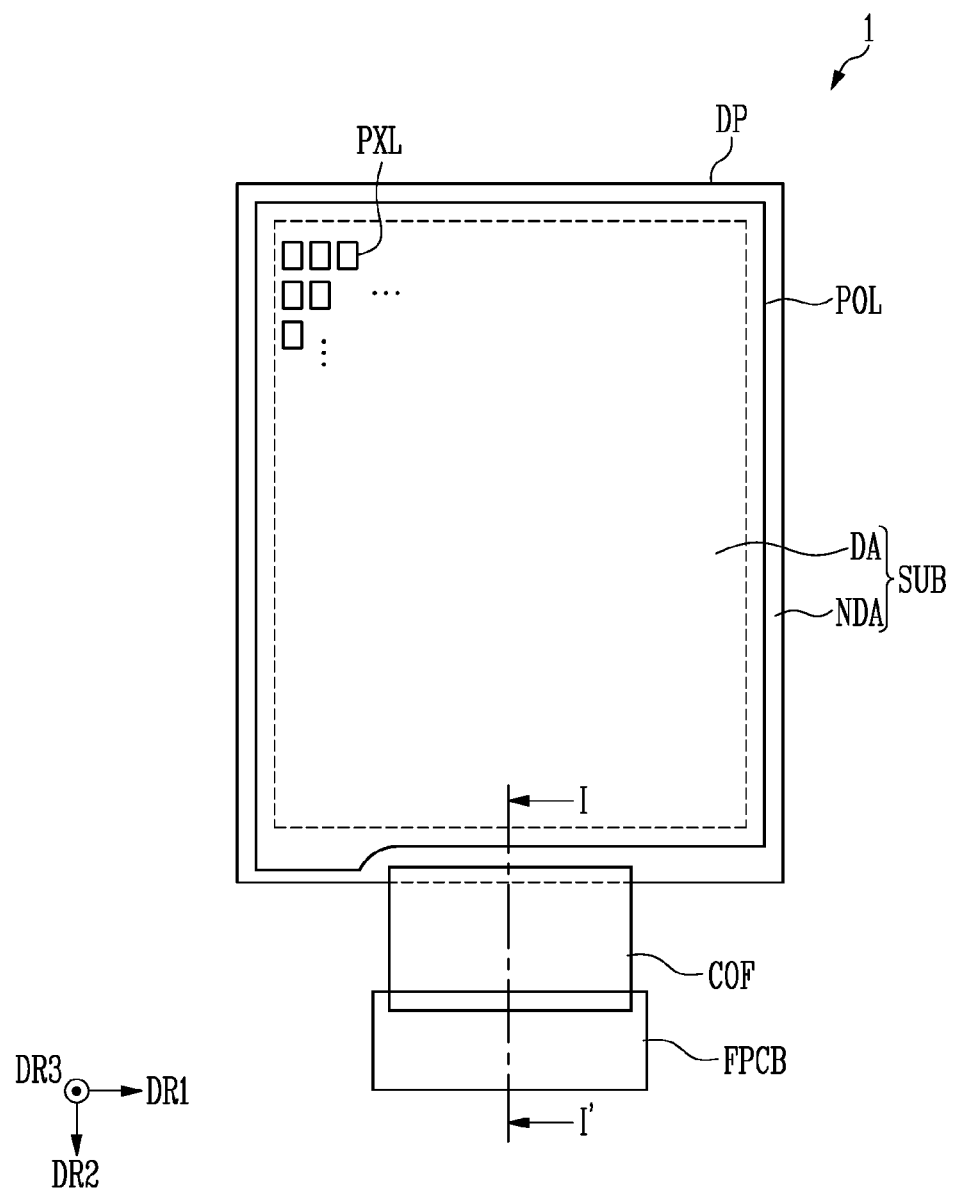
FIG. 2 is a plan view of the display device of FIG. 1.
Figure 3:
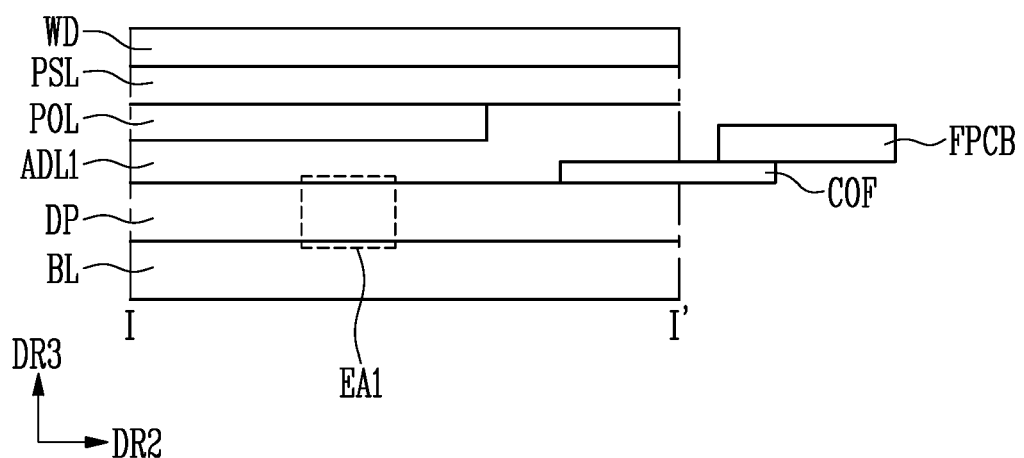
FIG. 3 is a cross-sectional view taken along line I-I' of FIG. 2.
Figure 5:
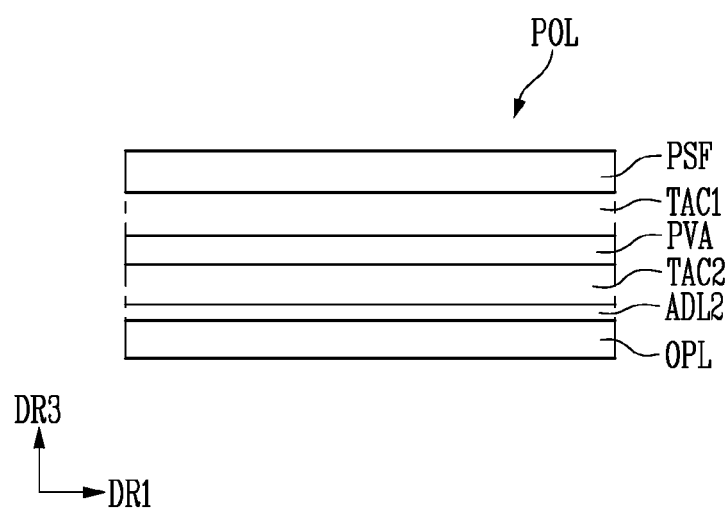
FIG. 5 is a cross-sectional view of a polarizing film included in the display device of FIG. 1.
Figure 6:
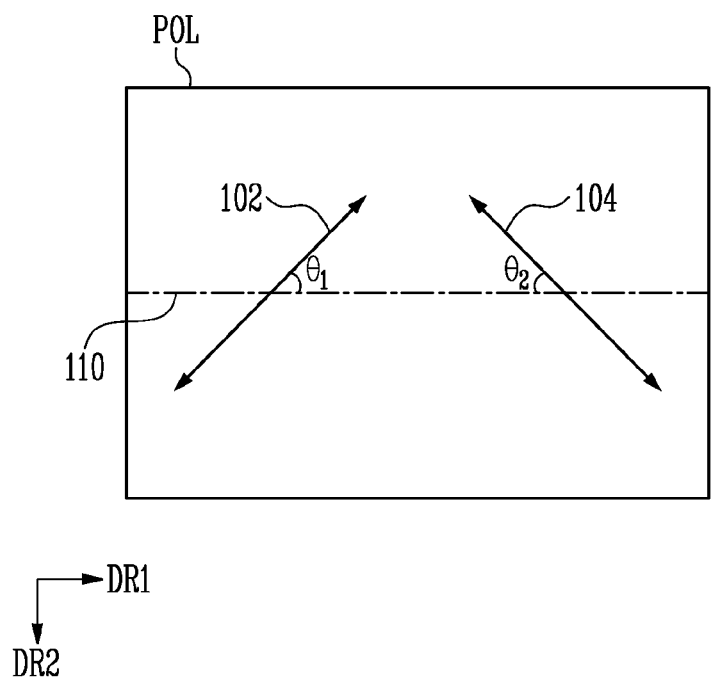
FIG. 6 is a plan view of the polarizing film included in the display device of FIG. 1.

FIG. 1 is a perspective view of a display device as an optical inspection target according to an embodiment. FIG. 2 is a plan view of the display device shown in FIG. 1. FIG. 3 is a cross-sectional view taken along line I-I' of FIG. 2. FIG. 5 is a cross-sectional view of a polarizing film included in the display device of FIG. 1. FIG. 6 is a plan view of the polarizing film included in the display device shown in FIG. 1.

The display device 1 refers to a device capable of providing visual data to a user. For example, the display device 1 may be a smart phone, a tablet PC, a large screen device, a mobile phone, a video phone, an electronic book reader, a desktop PC, a laptop PC, a netbook computer, a workstation, a server, a personal digital assistant (PDA), a portable multimedia player (PMP), an MP3 player, a medical appliance, a camera, or a wearable device. However, the inventive concepts are not limited thereto.

According to an embodiment, the display device 1 may be a flexible device. The flexible device 1 may be at least one of a bendable type device, a foldable type device, and a rollable type device, without being limited thereto.

The optical inspect device 20 may obtain optical data output from the display device 1 to determine the optical performance of the display device 1. For example, the optical inspection device 20 may be arranged on a front surface in a display direction (e.g., a third direction DR3) of the display device 1, to acquire optical data from the display device 1. The optical inspection device 20 will be described in more detail with reference to FIGS. 8 to 11.

The display device 1 may include a display panel DP, a driving circuit board DCB, and a polarizing film POL.

The display panel DP may include a substrate SUB, pixels PXL, a drive unit, and a line unit. The driving unit may include a scan driver, an emission driver, and a data driver.

The substrate SUB may include a rigid material or a flexible material depending on the type of the display device 1. However, the inventive concepts are not limited to a particular material of the substrate SUB.

The substrate SUB may include a display area DA and a non-display area NDA.

Light may be emitted in the display area DA, while light may not be emitted in the non-display area NDA.

The pixel PXL may be located on the substrate SUB. The pixel PXL may be located in the display area DA. Light may be emitted in the third direction DR3 in the display area DA. The pixels PXL may be arranged in a matrix form along rows extending in a first direction DR1 and columns extending in a second direction DR2.

The pixel PXL may include a light emitting element (see 'LD' shown in FIG. 4) capable of emitting light when an electrical signal is applied.

The driving unit may be located in the non-display area NDA when viewed in a plane. At least one of the scan driver, the emission driver, and the data driver may be located together with the line unit in the non-display area NDA. According to an embodiment, the driving unit may be disposed in the display panel DP. However, in another embodiment, the driving unit may be mounted on the driving circuit board DCB, and the inventive concepts are not limited to a particular position of the driving unit.

The driving unit may output electrical information provided to the pixel PXL. When electrical information is provided to the pixel PXL, the light emitting element LD included in the pixel PXL may emit light.

The scan driver may provide a scan signal to the pixel PXL through a scan line. The emission driver may provide an emission control signal to the pixel PXL through an emission control line. The data driver may provide a data signal to the pixel PXL through a data line.

The line unit may be located in the non-display area NDA when viewed in a plane. The line unit may electrically connect the driving unit and the pixel PXL.

The driving circuit board DCB may include a chip on film COF and a flexible circuit board FPCB.

The chip on film COF may provide the display panel DP with an electrical signal based on a signal applied from the flexible circuit board FPCB.

One end of the chip on film COF may be attached to the display panel DP, and the other end of the chip on film COF may be attached to the flexible circuit board FPCB. At least a portion of the chip on film COF may be bent.

The chip on film COF may include an insulating film and a plurality of lines provided on the insulating film. The chip on film COF commonly refers to a structure including an insulating film provided as a thin film and lines formed on the insulating film, and may also be referred to as a tape carrier package, a flexible printed circuit board, or the like. In some embodiments, a semiconductor chip connected to at least some of the lines may be further mounted on the insulating film of the chip on film COF.

A circuit element capable of processing an electrical signal to be applied to the display panel DP may be located on the flexible circuit board FPCB.

The flexible circuit board FPCB may be located on one surface or a rear surface of the display panel DP. One end portion of the flexible circuit board FPCB may be connected to the chip on film COF having a bent shape to be located on the rear surface of the display panel DP. As such, the flexible circuit board FPCB may not be viewed from the outside.

Referring to FIG. 3, the display device 1 may include a barrier layer BL, the display panel DP, the chip on film COF, the flexible circuit board FPCB, the polarizing film POL, a first adhesive ADL1, a protective layer PSL, and a window WD.

The barrier layer BL may be located on the bottom of the display panel DP to protect the display panel DP. The barrier layer BL may include a lower protective film provided as a multi-layer, in which single layers made of an inorganic insulating material and/or an organic insulating material are continuously stacked. The barrier layer BL may also include a cushion layer made of an elastic material. The cushion layer may be deformed by a force applied from the outside, and is restorable to an original state when the force applied from the outside is removed. The cushion layer may be provided as sponge having elasticity, or the like, but the inventive concepts are not limited thereto.

The flexible circuit board FPCB and the display panel DP may be connected by the chip on film COF. Referring to FIG. 3, opposing ends of the chip on film COF may be respectively connected to the display panel DP and the flexible circuit board FPCB as described above. In some embodiments, a portion of the chip on film COF may be bent such that the flexible circuit board FPCB is located on the rear surface of the display panel DP.

The display panel DP may include the pixel PXL including the light emitting element LD. The light emitting element LD may be configured as an organic light emitting diode or an inorganic light emitting diode, such as a micro light emitting diode or a quantum dot light emitting diode. Alternatively, the light emitting element LD may be a light emitting element configured with a combination of an organic material and an inorganic material. However, the inventive concepts are not limited to a particular type of the light emitting element LD. Hereinafter, the light emitting element LD will be described with reference to an organic light emitting diode as an example.

The display panel DP will be described in detail with reference to FIG. 4.

Figure 4:
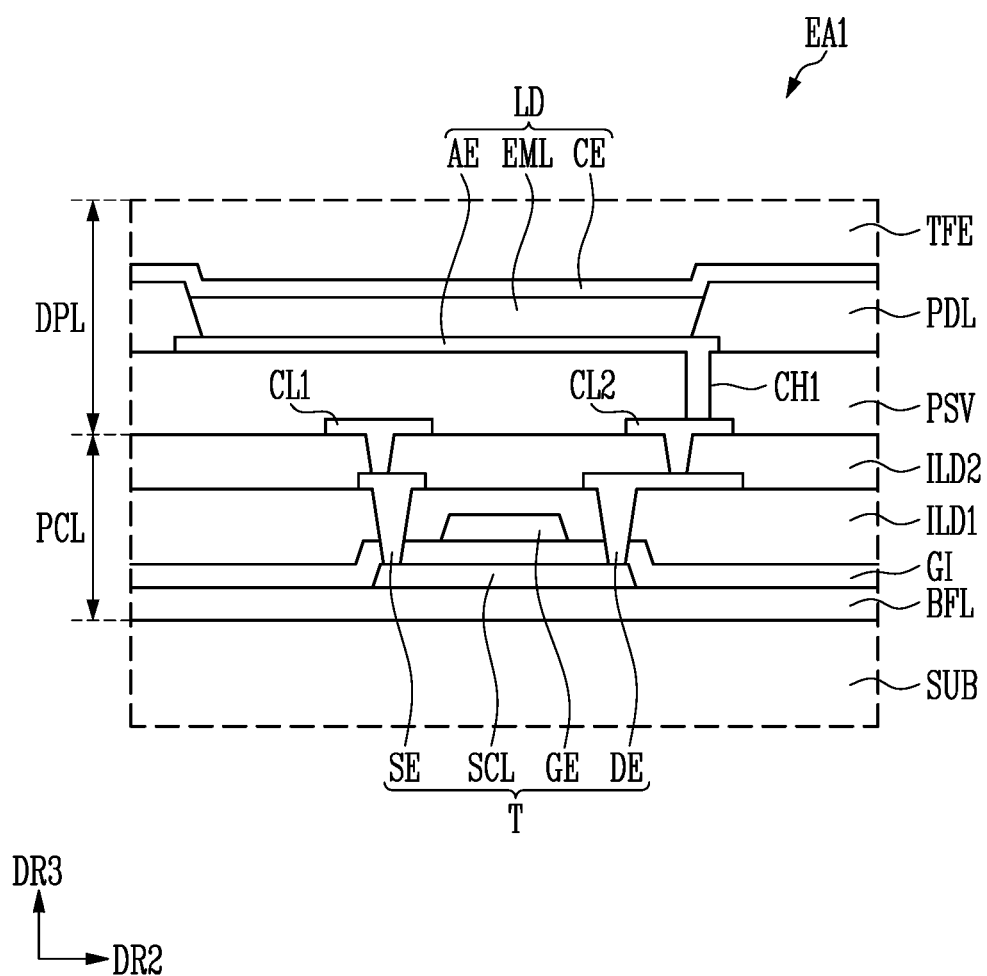
FIG. 4 is an enlarged view of area EA1 shown in FIG. 3.

FIG. 4 is an enlarged view of area EA1 shown in FIG. 3.

Referring to FIG. 4, the display device 1 may include the substrate SUB, a pixel circuit layer PCL, and a display element layer DPL.

The substrate SUB may include a rigid material or a flexible material as described above. The flexible material may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the inventive concepts are not limited to a particular material of the substrate SUB.

The pixel circuit layer PCL may be located on the substrate SUB. The pixel circuit layer PCL may include a buffer layer BFL, a gate insulating layer GI, a transistor, a first interlayer insulating layer ILD1, a second interlayer insulating layer ILD2, a first conductive line CL1, and a second conductive line CL2.

The buffer layer BFL may be arranged on the substrate SUB. The buffer layer BFL may prevent an impurity from being diffused into the transistor T.

The buffer layer BFL may include at least one of silicon nitride ($SiN_x$), silicon oxide ($SiO_x$), silicon oxynitride ($SiO_xN_y$), and metal oxide such as aluminum oxide ($AlO_x$), but is the inventive concepts are not limited thereto.

The transistor T may include a semiconductor pattern SCL, a source electrode SE, a drain electrode DE, and a gate electrode GE.

The semiconductor pattern SCL may be located on the buffer layer BFL. At least a portion of the semiconductor pattern SCL may overlap with the buffer layer BFL when viewed in a plane.

The semiconductor pattern SCL may be a semiconductor layer. For example, the semiconductor pattern SCL may include at least one of poly-silicon, amorphous silicon, and an oxide semiconductor.

The semiconductor pattern SCL may include a first contact region in contact with the source electrode SE and a second contact region in contact with the drain electrode DE.

The first contact region and the second contact region may correspond to a semiconductor pattern doped with an impurity. A region between the first contact region and the second contact region may be a channel region. The channel region may be an intrinsic semiconductor pattern undoped with the impurity.

The gate insulating layer GI may be provided over the semiconductor pattern SCL. The gate insulating layer GI may include an inorganic material. For example, the gate insulating layer GI may include at least one of silicon nitride ($SiN_x$), silicon oxide ($SiO_x$), silicon oxynitride ($SiO_xN_y$), and aluminum oxide ($AlO_x$). In some embodiments, the gate insulating layer GI may include an organic material.

The gate electrode GE may be located on the gate insulating layer GI. A position of the gate electrode GE may correspond to that of the channel region of the semiconductor pattern SCL. For example, the gate electrode GE may be disposed on the channel region of the semiconductor pattern SCL with the gate insulating layer GI interposed therebetween.

The first interlayer insulating layer ILD1 may be located over the gate electrode GE. As in the gate insulating layer GI, the first interlayer insulating layer ILD1 may include at least one of silicon nitride ($SiN_x$), silicon oxide ($SiO_x$), silicon oxynitride ($SiO_xN_y$), and aluminum oxide ($AlO_x$).

The source electrode SE and the drain electrode DE may be located on the first interlayer insulating layer ILD1. The source electrode SE may penetrate the gate insulating layer GI and the first interlayer insulating layer ILD1, and be in contact with the first contact region of the semiconductor pattern SCL. The drain electrode DE may penetrate the gate insulating layer GI and the first interlayer insulating layer ILD1, and be in contact with the second contact region of the semiconductor pattern SCL.

Although the source electrode SE and the drain electrode DE of the transistor T are described as individual electrodes, which penetrate the gate insulating layer GI and the first interlayer insulating layer ILD1 and electrically connected to the semiconductor pattern SCL, the inventive concepts are not limited thereto. In some embodiments, the source electrode SE of the transistor T may be one of the first and second contact regions adjacent to the channel region of the semiconductor pattern SCL of the transistor T, and the drain electrode DE of the transistor T may be the other of the first and second contact regions adjacent to the channel region of the semiconductor pattern SCL of the transistor T. The drain electrode DE of the transistor T may be electrically connected to a partial component of the display element layer DPL through a separate connector including a contact electrode, etc.

The second interlayer insulating layer ILD2 may be located over the source electrode SE and the drain electrode DE. As in the first interlayer insulating layer ILD1 and the gate insulating layer GI, the second interlayer insulating layer ILD2 may include an inorganic material. The inorganic material may include at least one of the materials that may form the first interlayer insulating layer ILD1 and/or the gate insulating layer GI, e.g., silicon nitride ($SiN_x$), silicon oxide ($SiO_x$), silicon oxynitride ($SiO_xN_y$), and aluminum oxide ($AlO_x$). In some embodiments, the second interlayer insulating layer ILD2 may include an organic material.

The first conductive line CL1 may be located on the second interlayer insulating layer ILD2, and be electrically connected to the source electrode SE through a contact hole penetrating through the second interlayer insulating layer ILD2.

The second conductive line CL2 may be located on the second interlayer insulating layer ILD2, and be electrically connected to the drain electrode DE through a contact hole penetrating through the second interlayer insulating layer ILD2.

Each of the first conductive line CL1 and the second conductive line CL2 may be a path through which an electrical signal can flow. In particular, the second conductive line CL2 may be a bridge electrode electrically connecting the drain electrode DE of the transistor T and a partial component of the display element layer DPL. For example, the first conductive line CL1 and the second conductive line CL2 may include at least one of molybdenum (Mo), tungsten (W), aluminum-neodymium (AlNd), titanium (Ti), aluminum (Al), and silver (Ag).

The display element layer DPL may be disposed on the pixel circuit layer PCL. The display element layer DPL may include a protective layer PSV, a first contact hole CH1, a pixel defining layer PDL, the light emitting element LD, and a thin film encapsulation layer TFE.

The protective layer PSV may be provided over the first conductive line CL1 and the second conductive line CL2. The protective layer PSV may be formed as an organic insulating layer, an inorganic insulating layer, or the organic insulating layer disposed on the inorganic insulating layer.

The protective layer PSV may include the first contact hole CH1 exposing one region of the second conductive line CL2.

The first contact hole CH1 may be a path through which an electrical signal provided from the transistor T is transferred.

The pixel defining layer PDL may define an emission area of each pixel PXL. The pixel defining layer PDL may include an organic material. For example, the pixel defining layer PDL may include at least one of acryl resin, epoxy resin, phenolic resin, polyamide resin, and polyimide resin.

The light emitting element LD may include a first electrode AE, an emitting layer EML, and a second electrode CE. The light emitting element LD may be disposed on the protective layer PSV.

One of the first and second electrodes AE and CE may be an anode electrode, and the other of the first and second electrodes AE and CE may be a cathode electrode. When the light emitting element LD is a top-emission organic light emitting diode, the first electrode AE may be a reflective electrode, and the second electrode CE may be a transmissive electrode. Hereinafter, the light emitting element LD will be described with reference to the top-emission organic light emitting diode, and the first electrode AE will be described with reference to the anode electrode as an example.

The first electrode AE may be located on the protective layer PSV. The first electrode AE may be electrically connected to the second conductive line CL2 through the first contact hole CH1. The first electrode AE may include a reflective layer capable of reflecting light or a transparent conductive layer disposed on the top or the bottom of the reflective layer. For example, the first electrode AE may be configured as a multi-layer and include a lower transparent conductive layer made of indium tin oxide (ITO), a reflective layer provided on the lower transparent conductive layer and including silver (Ag), and an upper transparent conductive layer provided on the reflective layer and including ITO. At least one of the transparent conductive layer and the reflective layer may be electrically connected to the drain electrode DE of the transistor T through the first contact hole CH1.

The emitting layer EML may be disposed in an opening of the pixel defining layer PDL. An area exposed by the opening of the pixel defining layer PDL and/or an area in which the emitting layer EML is disposed may be the emission area in which light is emitted. The emitting area EML may include an organic material.

The emitting layer EML may have a multi-layered thin film structure including at least a light generation layer. The emitting layer EML may include a hole injection layer for injecting holes, a hole transport layer having an excellent hole transporting property, the hole transport layer for increasing the opportunity for holes and electrons to be re-combined by suppressing the movement of electrons that were not combined in the light generation layer, the light generation layer for emitting light through the re-combination of the injected electrons and holes, a hole blocking layer for suppressing the movement of holes that were not combined in the light generation layer, an electron transport layer smoothly transporting electrons to the light generation layer, and an electron injection layer for injecting electrons. As described above, when an electrical signal is applied to the emitting layer EML, light may be emitted. The color of light generated in the emitting layer EML may be one of red, green, blue, and white, without being limited thereto. For example, the color of light generated in the emitting layer EML may also be one of magenta, cyan, and yellow.

The second electrode CE may be provided over the emitting layer EML. The second electrode CE may function as a common electrode disposed on the entire surface of the substrate SUB, but the inventive concepts are not limited thereto. The second electrode CE may include a transparent conductive material (or substance) such as one transparent conductive oxide among indium tin oxide (ITO), indium zinc oxide (IZO), aluminum zinc oxide (AZO), gallium doped zinc oxide (GZO), zinc tin oxide (ZTO), gallium tin oxide (GTO), indium gallium zinc oxide (IGZO), and fluorine doped tin oxide (FTO). In some embodiments, when the light emitting element LD is a bottom-emission organic light emitting diode, the second electrode CE may include a translucent conductive material (or substance) such as magnesium (Mg), silver (Ag), or an alloy thereof.

The thin film encapsulation layer TFE may be located on the second electrode CE. The thin film encapsulation layer TFE may include a plurality of insulating layers covering the light emitting element LD. More particularly, the thin film encapsulation layer TFE may include at least one inorganic layer and/or at least one organic layer. For example, the thin film encapsulation layer TFE may have a structure in which inorganic and organic layers are alternately stacked.

Referring back to FIG. 3, the polarizing film POL may transmit light emitted from the display panel DP, and reflect light introduced from the outside. Accordingly, the polarizing film POL can improve the visibility of the display device 1, and minimize light loss which may occur when light is provided from the light emitting element LD to the outside.

The polarizing film POL may be located in the display area DA when viewed in a plane. The polarizing film POL may be located at the front of the display panel DP. According to an embodiment, a partial area of the polarizing film POL is removed such that the polarizing film POL does not overlap with the chip on film COF.

The polarizing film POL will be described in more detail with reference to FIGS. 5 and 6.

Referring to FIG. 5, the polarizing film POL may include a polarizer PVA, a first TAC film TAC1, a second TAC film TAC2, a protective film PSF, and an optical layer OPL.

The polarizer PVA may have a polarizing axis, and polarize light in a direction vertical to the polarizing axis. For example, the polarizer PVA may absorb light which coincides with the polarizing axis, and allow light vertical to the polarizing axis to pass therethrough. As such, when light passes through the polarizer PVA, light may be linearly polarized in a direction vertical to the polarizing axis.

The polarizer PVA may include a uniaxially elongated polyvinyl alcohol-based resin film layer in which dichroic dye is oriented by adsorption. The polyvinyl alcohol-based resin film may be denaturalized, and polyvinyl formal, polyvinyl acetal, polyvinyl butyral, etc., which have been denatured as aldehydes may be used, for example. The dichroic dye may be, for example, iodine, organic dye, etc.

The polarizer PVA may be formed as a film such as a polyvinyl alcohol-based film, a polypropylene-based film, etc., a layer formed by coating, or a metal pattern layer such as a wire grid polarizer WGP, etc.

The first TAC film TAC1 and the second TAC film TAC2 may be respectively disposed on opposing surfaces of the polarizer PVA, and support and protect the polarizer PVA.

Each of the first TAC film TAC1 and the second TAC film TAC2 may be a resin film. The first TAC film TAC1 and the second TAC film TAC2 may be a cellulose-based resin such as triacetyl cellulose, a cyclo olefin-based resin such as norbornene-based resin, an olefin-based resin such as polyethylene or polypropylene, polyester-based resin, (met) acryl-based resin, etc.

The protective film PSF may be disposed on the first TAC film TAC1. The protective film PSF may prevent surface damage of the polarizer PVA.

The protective film PSF may include an adhesive. For example, the adhesive may be a solvent adhesive, an emulsion adhesive, a pressure sensitive adhesive, a solvent free adhesive, an adhesive on a film, or a hot-melt adhesive.

Alternatively, the adhesive may be a waterborne adhesive, of which a base material of the adhesive is dissolved or distributed in water, but the inventive concepts are not limited thereto.

The optical layer OPL may be located on the second TAC film TAC2 with a second adhesive ADL2 interposed therebetween. The second adhesive ADL2 may include a material that may form the first adhesive ADL1 described above, but the inventive concepts are not limited thereto.

The optical layer OPL may selectively transmit or reflect incident light by retarding the phase of applied light. For example, the optical layer OPL may selectively transmit or reflect light provided from the display panel DP or the polarizer PVA.

The optical layer OPL according to an embodiment may include at least one of a $\lambda/4$ phase retardation layer and a $\lambda/2$ phase retardation layer. The $\lambda/4$ phase retardation layer may retard the phase of applied light by $\lambda/4$. The $\lambda/2$ phase retardation layer may retard the phase of applied light by $\lambda/4$.

The optical layer OPL may include a coating base film such as cholesteric liquid crystal.

Referring to FIG. 6, the polarizing film POL may have a first reference line 110, a first absorption axis 102 forming a predetermined angle with the first reference line 110, and a first transmission axis 104 orthogonal to the first absorption axis 102.

The polarizing film POL may not transmit light parallel to the first absorption axis 102, and transmit light parallel to the first transmission axis 104 therethrough.

The first reference line 110 may be a virtual line parallel to the polarizing axis of optical image provided from the display panel DP. More particularly, light provided from the display panel DP may have a polarizing axis formed in a predetermined direction according to a predetermined reference, and the polarizing axis may become a reference line defining an angle of the first absorption axis 102 or the first transmission axis 104 of the polarizing film POL.

The first absorption axis 102 may form a first angle $\theta_1$ with the first reference line 110 of the polarizing film POL. The first absorption axis 102 and the first reference line 110 may have an angle therebetween of the first angle $\theta_1$. The first angle $\theta_1$ may be 45 degrees. Alternatively, the first angle $\theta_1$ may be 25 degrees to 65 degrees.

The first transmission axis 104 may form a second angle $\theta_2$ with the first reference line 110 of the polarizing film POL. The first transmission axis 104 and the first reference line 110 may have an angle therebetween of the second angle $\theta_2$. The second angle $\theta_2$ may be 45 degrees. Alternatively, the second angle $\theta_2$ may be 25 degrees to 65 degrees.

Referring back to FIG. 3, the first adhesive ADL1 may attach the display panel DP and the polarizing film POL. The first adhesive ADL1 may be a transparent adhesive or a gluing agent, which has high light transmittance. The first adhesive ADL1 may include a resin, an optically clear adhesive, and a pressure sensitive adhesive.

The protective layer PSL may be located on the polarizing film POL. The protective layer PSL may be disposed on the polarizing film POL with an adhesive layer interposed therebetween. The adhesive layer may connect the protective layer PSL and the polarizing film POL, and include a material that may form the first adhesive ADL1 described above.

The protective layer PSL may reduce external influence on the display panel DP. For example, the protective layer PSL may include an organic insulating layer, an inorganic insulating layer, or the organic insulating layer disposed on the inorganic insulating layer, but the inventive concepts are not limited thereto.

The window WD may be located on the protective layer PSL. The window WD may be disposed on the protective layer PSL with an adhesive layer interposed therebetween. The adhesive layer may attach the window WD and the protective layer PSL. The adhesive layer may include a material that may form the first adhesive ADL1 described above.

The window WD may reduce external influence on the display panel DP. The window WD reduces an external impact while transmitting light provided from the display panel DP therethrough to prevent damage or causing malfunction to the display device 1 from the external impact.

The window WD may include glass or quartz. For example, the window WD may include ultra thin glass.

In some embodiments, the display device 1 may further include a shock absorbing layer including a shock absorbing member having elasticity. The shock absorbing layer may be selectively provided according to mechanical characteristics required in the display device 1.

Hereinafter, an optical inspection device and optical inspection method according to an embodiment will be described with reference to FIGS. 7 to 11.

Figure 7:
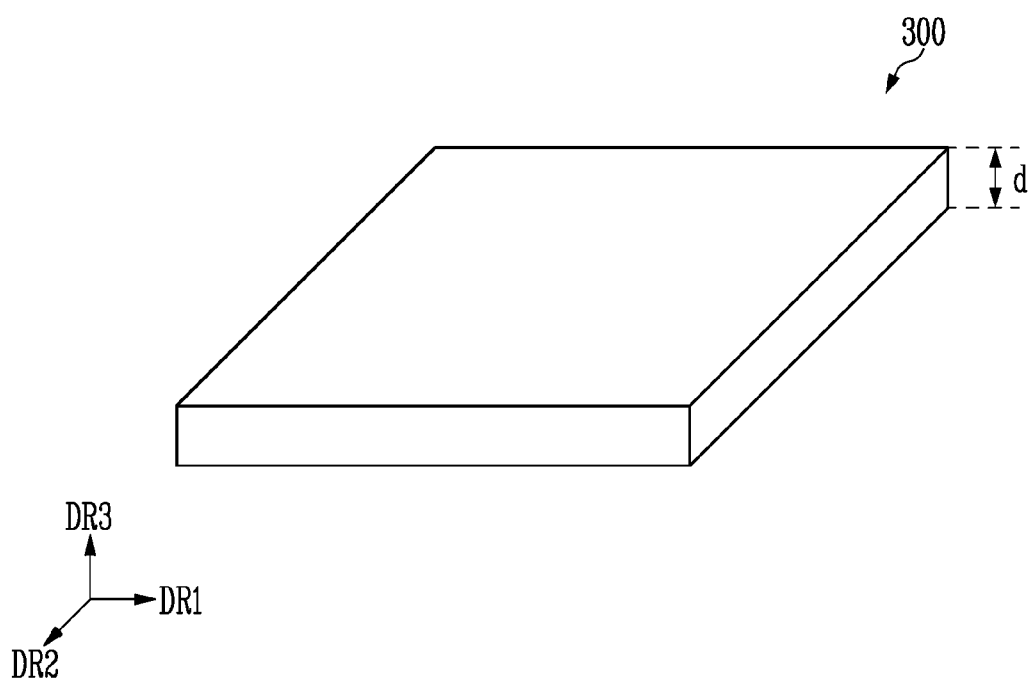
FIG. 7 is a perspective view for illustrating a phase difference.
Figure 8:
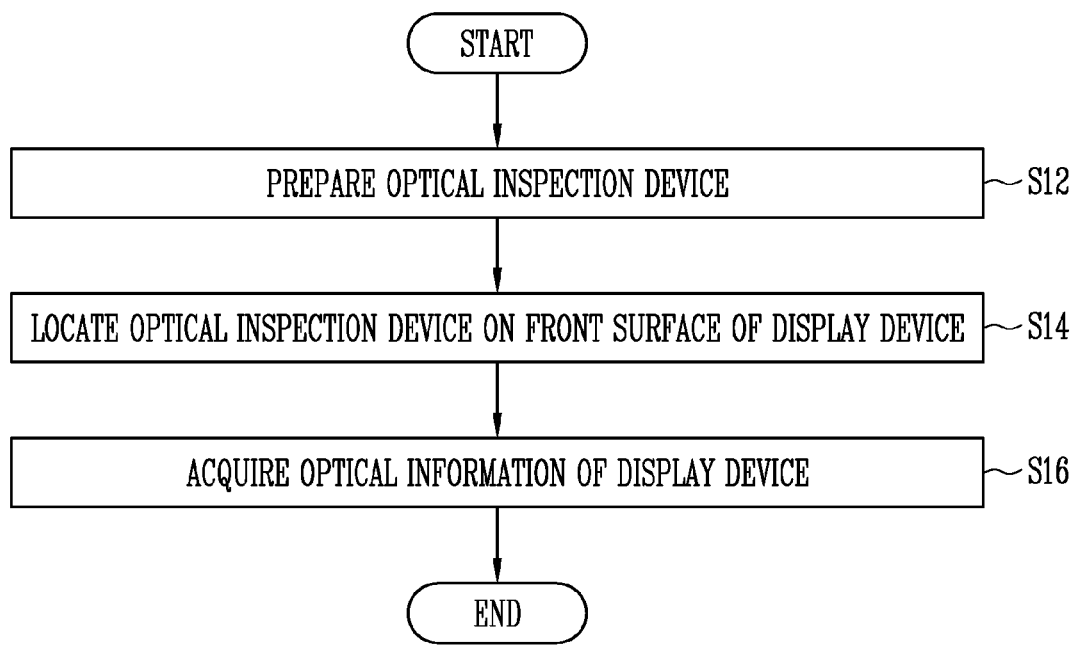
FIG. 8 is a flowchart illustrating an optical inspection method in accordance with an embodiment of the present disclosure.
Figure 9:
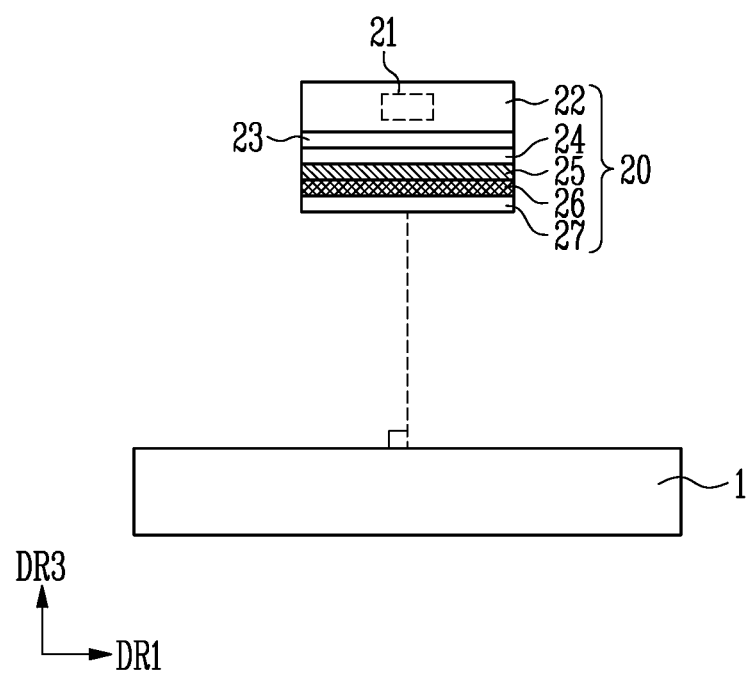
FIG. 9 is a schematic view illustrating an optical inspection state in accordance with an embodiment of the present disclosure.
Figure 11:
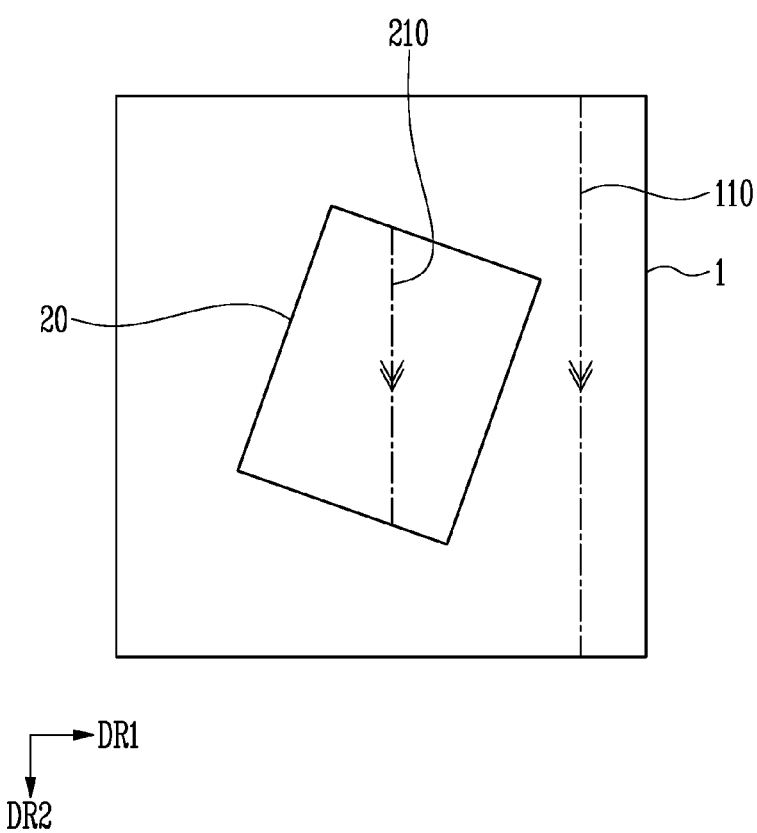
FIG. 11 is a schematic top view illustrating an optical inspection state in accordance with an embodiment of the present disclosure.

FIG. 7 is a perspective view for illustrating a phase difference. FIG. 8 is a flowchart illustrating an optical inspection method according to an embodiment. More particularly, the flowchart shown in FIG. 8 illustrates a method of inspecting optical performance of the display device 1 by using an optical inspection device according to an embodiment. FIG. 9 is a schematic view illustrating an optical inspection state according to an embodiment. FIG. is a plan view illustrating a polarizing part included in the optical inspection device according to an embodiment. FIG. 11 is a schematic top view illustrating an optical inspection state according to an embodiment.

Before an optical inspection method using the optical inspection device 20 will be described, the term 'phase difference' will be explained in more detail. As used herein, the 'phase difference' may refer to an in-plane phase difference of a target layer 300.

The target layer 300 may be at least one of the layers of the display device 1. The in-plane phase difference may be a parameter defined as a multiplication of a difference between refractive indices of different axes orthogonal to each other in a plane of the target layer 300 and a film thickness d.

For example, referring to FIG. 7, the different axes orthogonal to each other in the plane of the target layer 300 may correspond to the first direction DR1 and the second direction DR2. As such, a phase difference in the plane of the target layer 300 may be defined as '$|N_{DR1}-N_{DR2}|\times d$.' $N_{DR1}$ denotes a refractive index of the target layer 300 with respect to the first direction DR1, and $N_{DR2}$ denotes a refractive index of the target layer 300 with respect to the second direction DR2.

Hereinafter, an optical inspection device and an optical inspection method using the same according to an embodiment will be described.

Referring to FIG. 8, the optical inspection method according to an embodiment may include preparing an optical inspection device (S12), locating the optical inspection device on a front surface of a display device (S14), and acquiring optical information of the display device (S16).

More particular, in step S12, an optical inspection device 20 and a display device 1 may be provided. The optical inspection device 20 may acquire information on external light.

The optical inspection device 20 may inspect optical performance of the display device 1. Information for determining optical performance of the display device 1 may be acquired by the optical inspection device 20. For example, the optical inspection device 20 may acquire information on an intensity of an optical image output from the display device 1 for each spectrum, and/or information on whether a color deviation occurs, etc. The optical inspection device 20 may be a camera device, for example.

Referring to FIG. 9, the optical inspection device 20 may include a main body 22, a polarizing part 24, a phase film part 25, a phase retardation part 26, and a lens part 27. For example, the optical inspection device 20 may include an optical path, and the main body 22, the polarizing part 24, the phase film part 25, the phase retardation part 26, and the lens part 27 may be located on the optical path.

The main body 22 may receive light provided from the lens part 27. The main body 22 may include a light receiving part including a polarizer 23 having a predetermined polarizing axis, an image processor 21 capable of acquiring electrical information based on information on the provided light, and a housing supporting the appearance of the optical inspection device 20.

The image processor 21 may be implemented as a CPU or a device similar thereto according to hardware, software, or a combination thereof. The image processor 21 may acquire electrical information based on information on light polarized by the polarizer 23 included in the light receiving part.

In some embodiments, the main body 22 may include a memory part capable of storing the acquired electrical information or a communication part capable of communicating with an external computing device such that electrical information can be transmitted/received. The acquired electrical information may be provided to the outside, and the optical performance of the display device 1 may be computed by the external computing device.

The polarizing part 24 may be located on the main body 22. For example, the polarizing part 24 may be located between the lens part 27 and the main body 22. Alternatively, the polarizing part 24 may be further disposed in an outer area than the lens part 27 with respect to the main body 22.

The polarizing part 24 may transmit light applied to the optical inspection device therethrough, and reflect at least a portion of light introduced from the outside. The polarizing part 24 may transmit an image provided from the display device 1 therethrough. The polarizing part 24 may include a polarizing film. The polarizing part 24 may have a structure substantially identical to that of the polarizing film POL of the display device 1 shown in FIG. 5.

Figure 10:
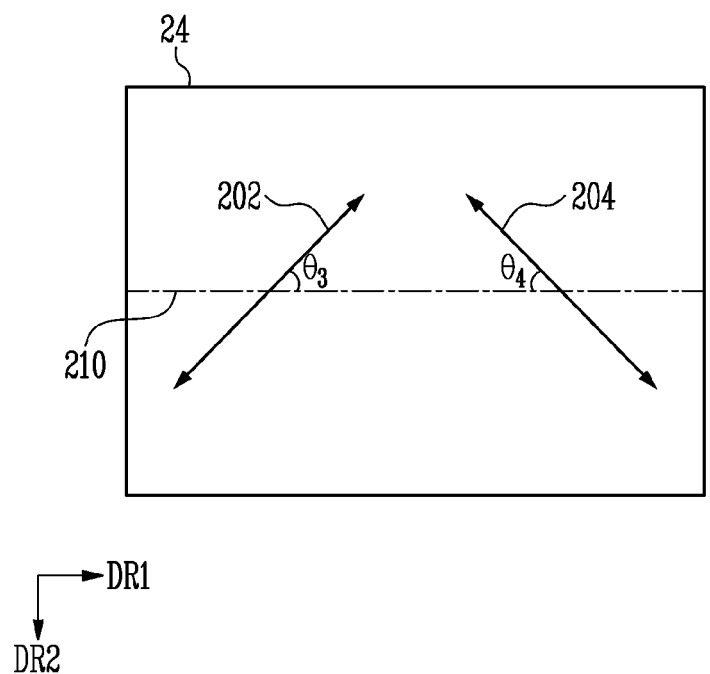
FIG. 10 is a plan view of a polarizing part included in an optical inspection device in accordance with an embodiment of the present disclosure.

Referring to FIG. 10, the polarizing part 24 may have a second absorption axis 202 and a second transmission axis 204. The second absorption axis 202 and the second transmission axis 204 may be orthogonal to each other. The polarizing part 24 may not transmit light parallel to the second absorption axis 202 therethrough, and transmit light parallel to the second transmission axis 204 therethrough. For example, light provided to the optical inspection device 20 may include an optical element having a direction parallel to the second absorption axis 202, which may not be provided to the main body 22.

A second reference line 210 may be parallel to the polarizing axis of the polarizer 23 included in the light receiving part.

The second absorption axis 202 may form a third angle $\theta_3$ with the second reference line 210. The second absorption axis 202 and the second reference line 210 may have an angle therebetween of the third angle $\theta_3$. The third angle $\theta_3$ may be 25 degrees to 65 degrees. Alternatively, the third angle $\theta_3$ may be 45 degrees.

The second transmission axis 204 may form a fourth angle $\theta_4$ with the second reference line 210. The second transmission axis 204 and the second reference line 210 may have an angle therebetween of the fourth angle $\theta_4$. The fourth angle $\theta_4$ may be 25 degrees to 65 degrees. Alternatively, the fourth angle $\theta_4$ may be 45 degrees.

The phase film part 25 may be located on an optical path of light provided to the optical inspection device 20. For example, the phase film part 25 may be located on one surface of the lens part 27, which faces the outside. Light provided from the outside may be transmitted through the phase film part 25 and then provided to the lens part 27. Alternatively, the phase film part 25 may be disposed between the main body 22 and the lens part 27. The phase film part 25 may include a plurality of layers each having a predetermined phase difference or be implemented as a single layer.

The phase film part 25 may transmit the provided light therethrough by changing the phase difference of the provided light. The phase film part 25 may have a phase difference of 7000 nm or more. Alternatively, in some embodiments, the phase film part 25 may have a phase difference of 8000 nm or more. When the phase film part 25 is configured as a single layer, the single layer of the phase film part 25 may have a phase difference of 7000 nm or more (or 8000 nm or more). Alternatively, when the phase film part 25 is configured as a plurality of layers, the total sum of phase differences of the plurality of layers forming the phase film part 25 may be 7000 nm or more (or 8000 nm or more).

The phase film part 25 may have a first optical axis. For example, the first optical axis of the phase film part 25 and any one of the second absorption axis 202 and the second transmission axis 204 of the polarizing part 24 may have an angle therebetween of 25 degrees to 65 degrees. Alternatively, the first optical axis of the phase film part 25 and any one of the second absorption axis 202 and the second transmission axis 204 of the polarizing part 24 may have an angle therebetween of 45 degrees.

As another example, the first optical axis of the phase film part 25 and any one of the first absorption axis 102 and the first transmission axis 104 of the polarizing film POL included in the display device 1 may have an angle therebetween of 25 degrees to 65 degrees. Alternatively, the first optical axis of the phase film part 25 and any one of the first absorption axis 102 and the first transmission axis 104 of the polarizing film POL included in the display device 1 may have an angle therebetween of 45 degrees.

In accordance with an embodiment, the first optical axis of the phase film part 25 and the predetermined polarizing axis of the polarizer 23 included in the light receiving part may have an angle therebetween of 25 degrees to 65 degrees or an angle therebetween of 45 degrees.

The phase retardation part 26 may retard the phase of the provided light. For example, the phase retardation part 26 may be a λ/4 phase retardation layer. The phase retardation part 26 may retard the phase of light provided thereto by λ/4. For example, when light having an optical axis of 90 degrees with respect to a predetermined line is provided to the phase retardation part 26, the light transmitted through the phase retardation part 26 may have an optical axis of 135 degrees.

The phase retardation part 26 may be located on the optical path of light provided to the optical inspection device 20. For example, the phase retardation part 26 may be located on one surface of the lens part 27, which faces the outside. Light provided from the outside may be transmitted through the phase retardation part 26 and then provided to the lens part 27. Alternatively, the phase retardation part 26 may be located between the lens part 27 and the main body 22. The phase retardation part 26 may be disposed the lens part 27 and the image processor of the main body 22.

The inventive concepts are not limited to a particular positional relationship between the phase retardation part 26 and the phase film part 25. For example, in accordance with an embodiment, the phase retardation part 26 may be located outwardly of the phase film part 25. Alternatively, the phase retardation part 26 may be located outwardly of the phase retardation part 26.

When light applied to the phase retardation part 26 is linearly polarized light, light transmitted through the phase retardation part 26 and then output may be circularly polarized light. For example, the phase retardation part 26 may be a λ/4 phase retardation layer. In this case, linearly polarized light having an optical axis of 90 degrees with respect to a reference line may be transmitted through the phase retardation part 26, and then be output as circularly polarized light having an optical axis of 135 degrees with respect to the reference line.

The phase retardation part 26 may have a second optical axis. Any one of the second absorption axis 202 and the second transmission axis 204 and the second optical axis may have an angle therebetween of 25 degrees to 65 degrees, or an angle therebetween of 45 degrees. The second optical axis and the predetermined polarizing axis of the polarizer 23 included in the light receiving part may have an angle therebetween of 25 degrees to 65 degrees, or an angle therebetween of 45 degrees.

In another embodiment, the second optical axis of the phase retardation part 26 and any one of the first absorption axis 102 and the first transmission axis 104 of the polarizing film POL included in the display device 1 may have an angle therebetween of 25 degrees to 65 degrees. Alternatively, the second optical axis of the phase retardation part 26 and any one of the first absorption axis 102 and the first transmission axis 104 of the polarizing film POL included in the display device 1 may have an angle therebetween of 45 degrees.

The phase retardation part 26 may retard the phase of the provided light by a first phase. The angle formed between the second absorption axis 202 and the second transmission axis 204 of the polarizing part 24 and the first optical axis of the phase film part 25 may be equal to the first phase. Alternatively, the angle formed between the second absorption axis 202 and the second transmission axis 204 of the polarizing part 24 and the predetermined polarizing axis of the light receiving part may be equal to the first phase. In this manner, the reliability of optical inspection can be further improved. For example, as described above, optical inspection on the display device 1 may be performed while the polarizing part 24 and the phase film part 25, or the polarizing part 24 and the light receiving part may have a predetermined angle therebetween. However, in some embodiments, the predetermined angle can be changed due to the position of the optical inspection device 20 and/or a change in pose of the optical inspection device such as mechanical tremor during performance of the optical inspection, which may distort optical information. Accordingly, when the phase of light retarded by the phase retardation part 26 is set equal to the predetermined angle, an optical property is compensated by the first phase corresponding to the predetermined angle even when the position of the optical inspection device 20 and/or the change in pose occurs, so that the distortion of optical information can be further prevented.

The lens part 27 may receive light provided from the outside. The lens part 27 may provide the main body 22 with the provided light. For example, the lens part 27 may have a lens shape and provide image information of an object to the main body 22 along a predetermined optical path.

In some embodiments, although not shown in the drawings, when the lens part 27 is located between the main body 22 and the polarizing part 24, optical information provided to the lens part 27 may be image data of which optical characteristics are changed by the polarizing part 24.

In step S14, the optical inspection device 20 may be disposed on the front surface of display device 1.

In particular, the optical inspection device 20 may be arranged at a position at which at least a portion of light output from the display device 1 can be observed. The optical inspection device 20 is disposed on the front surface of the display device 1, which face in the display direction (e.g., the third direction DR3), to receive light output from the display device 1. For example, the optical inspection device 20 may be arranged such that a main surface of the display device 1 and a main surface of the optical inspection device 20 are parallel to each other, without being limited thereto.

In step S14, the optical inspection device 20 may be arranged such that the second reference line 210 is parallel or orthogonal to the first reference line 110 with respect to the display device 1. For example, referring to FIG. 11, the optical inspection device 20 may be inclined or rotated with respect to the display device 1 such that the second reference line 210 is parallel to the first reference line 110 when the optical inspection device 20 is disposed on the front surface of the display device 1.

In the acquiring (S16), the optical inspection device 20 may acquire information on light output from the display device 1. The optical inspection device 20 may acquire information for testing the optical performance of the display device 1.

In step S16, the image processor included in the main body 22 may compute electrical information based on the light output from the display device 1. For example, when first light is displayed at a first point of the display area DA of the display device 1 and second light is displayed at a second point of the display area DA, the image processor may output an electrical signal including information that the first light has been displayed at the first point and information that the second light has been displayed at the second point.

In this manner, the reliability of the optical inspection device 20 and the optical inspection method using the same may be improved. More particularly, the light output from the display device 1 may be a combination of lights of a plurality of colors, and the output light should have properties of white light to properly test the optical performance of the display device 1 from the outside. However, when the output light has the plurality of colors combined as described above, each color may be viewed individually. Accordingly, an optical property such as a color deviation may be distorted. However, in accordance with an embodiment, the phase difference of the light output from the display device 1 is tuned to a predetermined numerical range, so that the output light which may otherwise be individually viewed can have properties of gray light and/or white light. That is, the probability that the output light will be individually viewed is decreased, so that the distortion of optical properties of the light output from the display device 1, including a color deviation, can be prevented.

In addition, according to a conventional optical inspection method, the pose or position of a conventional optical inspection device may be changed due to a mechanical tremor or a defect during optical inspection, and therefore, the optical performance of the display device 1 may not be properly measured. However, in accordance with an embodiment of the inventive concepts, the optical axis of any one of the layers provided in the optical inspection device 20 and/or the display device 1 is controlled, so that an error arising out from a mechanical factor may be compensated even when the position and/or pose of the optical inspection device 20 is changed during the optical inspection. Accordingly, the reliability of the optical inspection can be maintained.

According to embodiments, an optical inspection device for optical performance test of a display device and an optical inspection method using the same improves optical inspection reliability.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical inspection device for an optical performance test of a display device, comprising:
   a main body;
   a lens part disposed on the main body and configured to transmit external light; and
   a phase film part disposed between the main body and the lens part, and configured to change a phase difference of the external light and transmit the external light; and
   a phase retardation part disposed between the phase film part and the lens part, the phase retardation part being configured to retard a phase of light provided thereto,
   wherein the main body includes an image processor configured to obtain electrical information of the external light, and
   wherein a phase difference of the phase film part is at least 7000 nm.

2. The optical inspection device of claim 1, wherein the phase retardation part comprises a $\lambda/4$ phase retardation layer.

3. The optical inspection device of claim 1, wherein the phase film part has a phase difference of at least 8000 nm.

4. The optical inspection device of claim 1, wherein the phase retardation part has a second optical axis, and an angle defined between the second optical axis and one of the first absorption axis and the first transmission axis is in a range of 25 degrees to 65 degrees.

5. The optical inspection device of claim 1, wherein the phase retardation part has a second optical axis, and an angle defined between the second optical axis and the first polarizing axis is in a range of 25 degrees to 65 degrees.

6. The optical inspection device of claim 1, further comprising a polarizing part having a first absorption axis and a first transmission axis vertical to the first absorption axis, the polarizing part being configured to not transmit light parallel to the first absorption axis and transmit light parallel to the first transmission axis, wherein the main body further includes a polarizer having a first polarizing axis.

7. The optical inspection device of claim 6, wherein an angle defined between the first polarizing axis and the first absorption axis or the first transmission axis is in a range of 25 degrees to 65 degrees.

8. The optical inspection device of claim 6, wherein the phase film part has a first optical axis, and an angle defined between the first optical axis and one of the first absorption axis and the first transmission axis is in a range of 25 degrees to 65 degrees.

9. The optical inspection device of claim 6, wherein the phase film part has a first optical axis, and an angle defined between the first optical axis and the first polarizing axis is in a range of 25 degrees to 65 degrees.

* * * * *